United States Patent
Li

(10) Patent No.: US 10,025,431 B2
(45) Date of Patent: Jul. 17, 2018

(54) GESTURE DETECTION

(71) Applicant: AT&T Intellectual Property I, L.P., Atlanta, GA (US)

(72) Inventor: Kevin Li, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 290 days.

(21) Appl. No.: 14/078,982

(22) Filed: Nov. 13, 2013

(65) Prior Publication Data

US 2015/0130743 A1    May 14, 2015

(51) Int. Cl.
| | | |
|---|---|---|
| *G06F 3/044* | (2006.01) | |
| *G06F 3/0488* | (2013.01) | |
| *G06F 3/01* | (2006.01) | |
| *G06F 3/041* | (2006.01) | |

(52) U.S. Cl.
CPC .............. *G06F 3/044* (2013.01); *G06F 3/017* (2013.01); *G06F 3/0416* (2013.01); *G06F 3/0488* (2013.01); *G06F 2203/04108* (2013.01)

(58) Field of Classification Search
CPC . G06F 3/033; G06F 3/044; G06F 7/00; G06F 3/017; G06F 3/0416; G06F 3/0488; G06F 2203/04108; G06K 9/00; G06K 9/00335; H04W 4/046

See application file for complete search history.

(56) References Cited

U.S. PATENT DOCUMENTS

| | | |
|---|---|---|
| 5,977,957 A | 11/1999 | Miller |
| 7,138,727 B2 | 11/2006 | Hein et al. |
| 7,193,617 B1 | 3/2007 | Kanbara et al. |
| 7,489,303 B1 | 2/2009 | Pryor |
| 7,683,890 B2 | 3/2010 | Geaghan |
| 7,920,102 B2 | 4/2011 | Breed |
| 7,999,660 B2 | 8/2011 | Cybart et al. |
| 8,130,202 B2 | 3/2012 | Levine et al. |
| 8,358,286 B2 | 1/2013 | Cannon |
| 8,396,252 B2 | 3/2013 | Dokor |
| 8,405,618 B2 | 3/2013 | Colgate et al. |
| 8,482,535 B2 | 7/2013 | Pryor |
| 8,493,354 B1 | 7/2013 | Birnbaum et al. |
| 8,797,295 B2 | 8/2014 | Bernstein et al. |

(Continued)

FOREIGN PATENT DOCUMENTS

JP    2011220894    11/2011

OTHER PUBLICATIONS

AN3863.pdf: two pages extracted from application note by Freescale Semiconductor published on Jul. 2011, downloadable from website: https://cache.freescale.com/files/sensors/doc/app_note/AN3863.pdf.*

(Continued)

*Primary Examiner* — Amr Awad
*Assistant Examiner* — Wing Chow
(74) *Attorney, Agent, or Firm* — Chiesa Shahinian & Giantomasi PC

(57) ABSTRACT

Methods, systems, and products sense contactless gestures. A capacitive sensor measures capacitance during performance of a gesture. The capacitive sensor generates an output signal that is compared to a database. The database stores different output signals that are associated to different commands. The corresponding command is executed in response to the performance of the gesture.

20 Claims, 23 Drawing Sheets

(56) References Cited

U.S. PATENT DOCUMENTS

| | | |
|---|---|---|
| 2003/0109972 A1* | 6/2003 | Tak .................................. 701/29 |
| 2003/0122779 A1 | 7/2003 | Martin et al. |
| 2004/0263489 A1 | 12/2004 | Wallenius |
| 2009/0273583 A1 | 11/2009 | Norhammar |
| 2010/0141410 A1 | 6/2010 | Aono et al. |
| 2010/0328053 A1 | 12/2010 | Yeh et al. |
| 2011/0102341 A1 | 5/2011 | Imai et al. |
| 2012/0062491 A1 | 3/2012 | Coni |
| 2012/0068956 A1 | 3/2012 | Jira et al. |
| 2012/0081337 A1 | 4/2012 | Camp et al. |
| 2012/0154316 A1 | 6/2012 | Kono |
| 2012/0194483 A1 | 8/2012 | Deluca |
| 2012/0229407 A1 | 9/2012 | Harris et al. |
| 2012/0262403 A1 | 10/2012 | Tissot |
| 2012/0286847 A1 | 11/2012 | Peshkin et al. |
| 2013/0044073 A1 | 2/2013 | Christiansson et al. |
| 2013/0063336 A1 | 3/2013 | Sugimoto et al. |
| 2013/0090807 A1 | 4/2013 | Kojima et al. |
| 2013/0120257 A1 | 5/2013 | Park |
| 2013/0151031 A1 | 6/2013 | Ricci |
| 2013/0156296 A1 | 6/2013 | El Dokor |
| 2013/0187889 A1 | 7/2013 | Pandher et al. |
| 2013/0191741 A1 | 7/2013 | Dickinson et al. |
| 2013/0204457 A1 | 8/2013 | King et al. |
| 2014/0050354 A1* | 2/2014 | Heim et al. ................... 382/103 |
| 2014/0160027 A1* | 6/2014 | Bateman ................. G06F 3/017 |
| | | 345/168 |
| 2014/0267175 A1 | 9/2014 | Hecht et al. |
| 2015/0094083 A1 | 4/2015 | Ngo |

OTHER PUBLICATIONS

Palinko, Szabolcs, "Hambone: A Bio-Acoustic Gesture Interface".

Banter, Bruce, "Touch Screens and Touch Surfaces are Enriched by Haptic Force-Feedback", Enabling Technology, Information Display, Mar. 2010, 5 pgs.

"Integrating Gesture Control Inside the Car"—Publitek European Editors.

Reiner A., "Gestural Interaction in Vehicular Applications".

Sebatian Anthony, "Piezoelectrics bring tacticle, haptic feedback to touchscreens," ExtremeTech, Nov. 16, 2011, 2 pgs.

Cha, Bonnie, "Motorola Backflip—Platinum Silver (AT&T) Review," CNET Mar. 2, 2010, 5 pgs.

* cited by examiner

GESTURE DETECTION

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Gesture detection is common. Many set-top boxes, remote controls, and mobile devices may be controlled using physical gestures. Gestures may even be used to control an automotive environment, such as power windows. In conventional gesture control, a user places her finger on a gesture surface and performs some gesture.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
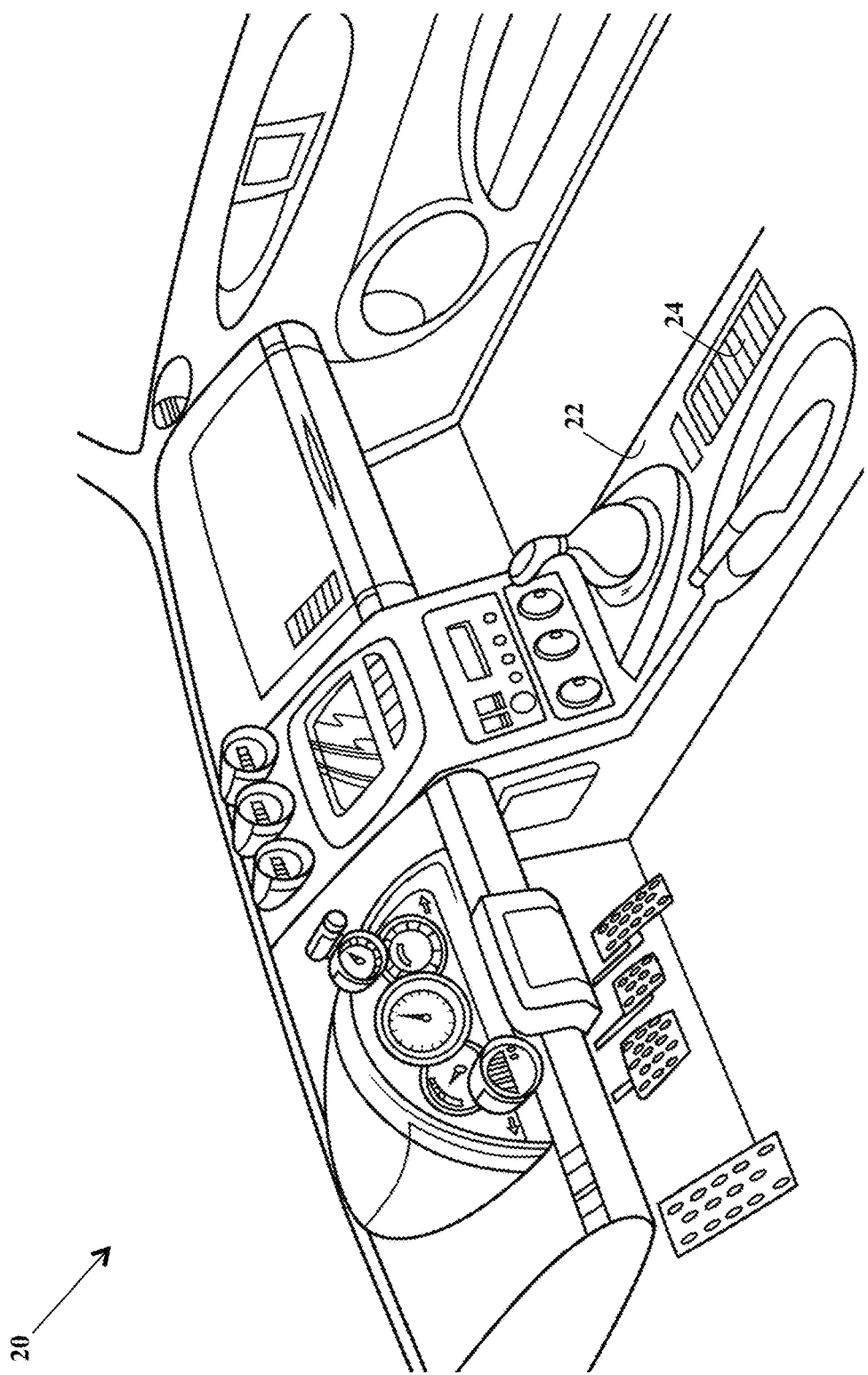
FIGS. 1 and 2 are simplified schematics illustrating an environment in which exemplary embodiments may be implemented.
Figure 2:
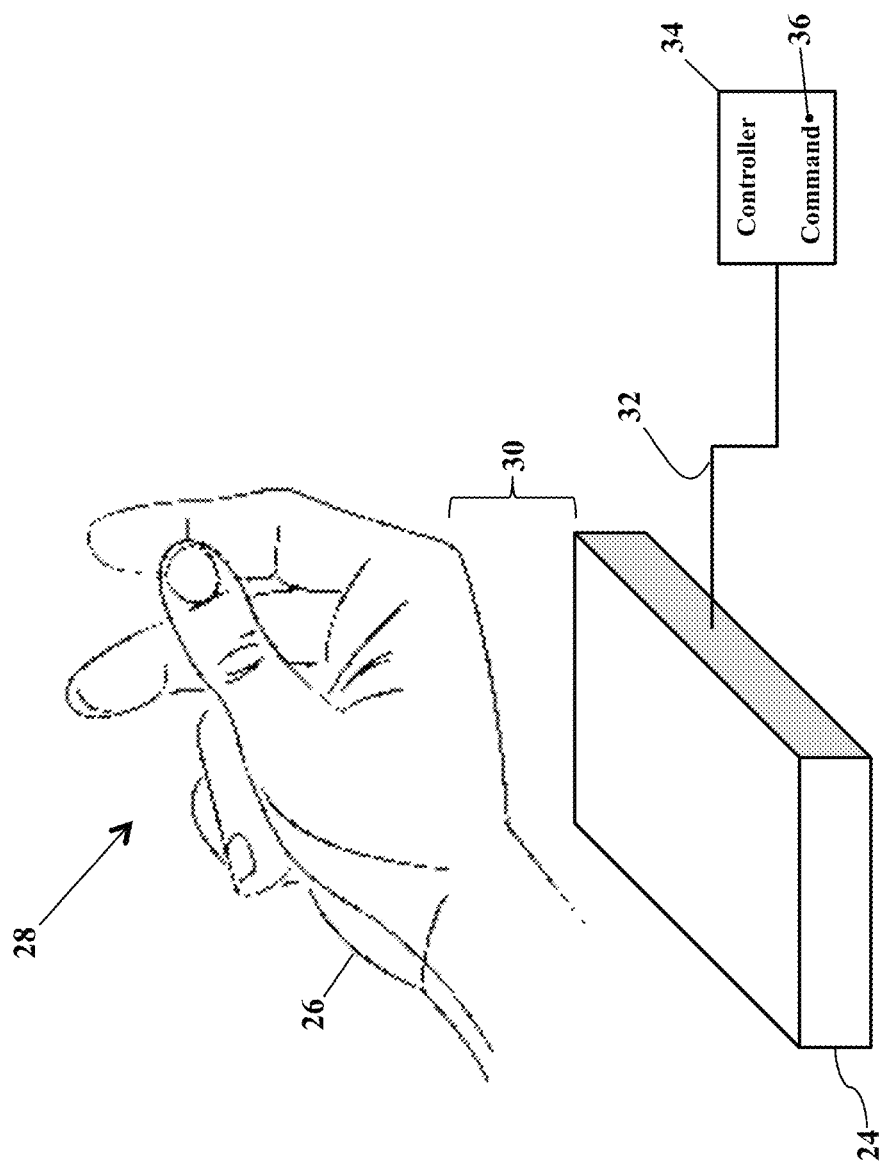

FIGS. 1-2 are simplified schematics illustrating an environment in which exemplary embodiments may be implemented. FIG. 1 illustrates an automotive interior 20 having a center console 22. The automotive interior 20 has many buttons, switches, and other conventional controls for driving a vehicle, so the details need not be explained. However, FIG. 1 also illustrates a gesture detector 24. The gesture detector 24 is illustrated as being located on the center console 22, but the gesture detector 24 may be placed at any location within the automotive interior 20 (as later paragraphs will explain). Wherever the gesture detector 24 is located, the gesture detector 24 senses hand gestures that are performed to control the vehicle. FIG. 2, for example, illustrates a driver's human hand 26 performing a hand gesture 28 in a vicinity of the gesture detector 24. The gesture detector 24 is enlarged for clarity. As the driver's hand performs the gesture 28, the gesture detector 24 senses a capacitance 30 between the driver's hand 26 and the gesture detector 24. The gesture detector 24 then generates an output signal 32 that is proportional to the capacitance 30. The output signal 32 is analyzed (such as by a controller 34) to execute a command 36. The driver's hand 26, for example, may perform the hand gesture 28 to lock the car doors. Another gesture may open a sunroof. Still another gesture may turn on the headlights. Even more gestures may select a radio station, answer a hands-free call, or apply the brakes. Whatever the gesture 28, exemplary embodiments interpret the gesture 28 and execute the corresponding command 36. Indeed, the user may associate any gesture to any action, as later paragraphs will explain.

Exemplary embodiments thus greatly improve gesture detection. Conventional gesture detection utilizes infrared vision systems and/or environmental markers (such as motion capture suits). Infrared detection, though, is poor in bright environments, where ambient light typically washes out the infrared spectrum. Indeed, automotive interiors often have large solar glass expanses that make infrared detection infeasible. Exemplary embodiments, instead, detect gestures using the capacitance 30. The gesture detector 24 thus does not rely on the infrared spectrum, so the gesture detector 24 recognizes gestures even in external environments where current sensor technologies fail. The gesture detector 24 may thus be dispersed throughout the automotive interior 20 for detection and interpretation of driver and passenger gestures.

Exemplary embodiments thus greatly increase safety. Conventional automotive interiors have knobs, buttons, and stalks that must be physically manipulated to control a vehicle. Exemplary embodiments, instead, recognize gesture inputs that do not require physical contact with automotive controls. The driver's hand and/or fingers may make movements without removing the driver's eye from the road. Exemplary embodiments recognize the gesture 28 and safely execute the corresponding command 36. The gesture detector 24 recognizes simple snaps and swipes, more complex geometric shapes, and even alphanumeric characters. Whatever the gesture 28, exemplary embodiments allow safe and complete control of the automotive environment.

The gesture 28 may be touch less. Conventional gesture detectors require contact between the hand 26 and some gesture surface. Indeed, many vehicles have conventional touch screens that allow the driver's fingers to scroll or swipe among selections of items and tap to select. FIGS. 1 and 2, though, require no contact between the driver's hand 26 or fingers and the gesture detector 24. Exemplary embodiments, instead, utilize contactless, touch less gestures to execute the command 36. That is, the driver's hand 26 performs any two- or three-dimensional gesture 28 that need not contact some touch-sensing surface. As the driver's hand 26 performs the gesture 28, the capacitance 30 between the driver's hand 26 and the gesture detector 24 changes. Exemplary embodiments use the capacitance 30 to determine which command 36 is executed. So, again, the driver need not be distracted when trying to find and touch the gesture detector 24. The driver need only perform the gesture 28 to execute the corresponding command 36.

Figure 3:
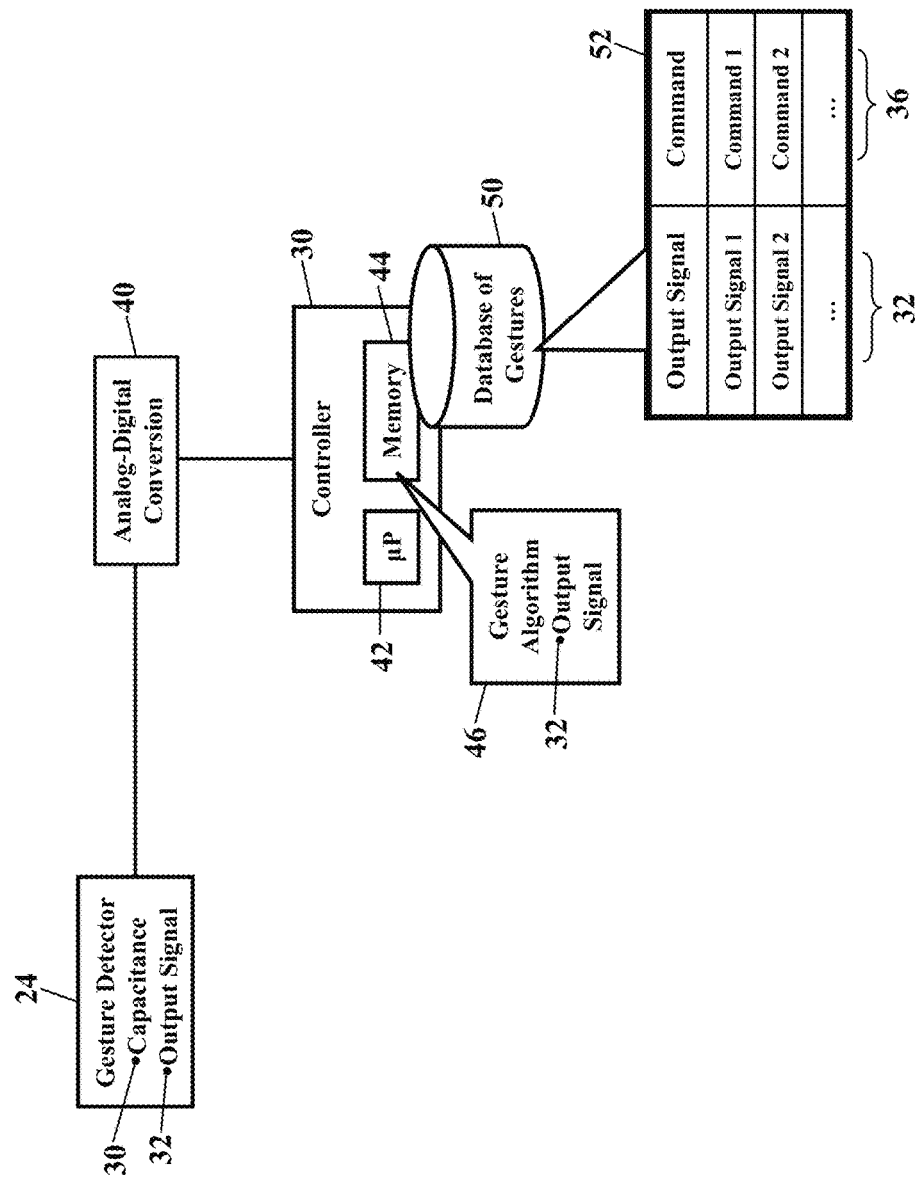
FIG. 3 is a more detailed block diagram illustrating the operating environment, according to exemplary embodiments.

FIG. 3 is a more detailed block diagram illustrating the operating environment, according to exemplary embodiments. FIG. 3 illustrates the gesture detector 24 interfacing with the controller 30. The gesture detector 24 senses the capacitance 30 and generates the output signal 32. If the output signal 32 has an analog form, digital conversion 40 may be required. When the controller 30 receives the output signal 32, the controller 30 interprets the output signal 32. The controller 30 has a processor 42 and a memory 44. The processor 42 may be a microprocessor ("µP"), an application specific integrated circuit (ASIC), or other component that executes a gesture algorithm 46 stored in the memory 44. The gesture algorithm 46 includes instructions, code, operations, and/or programs that cause the processor 42 to interpret any gesture input sensed by the gesture detector 24. When the gesture (illustrated as reference numeral 28 in FIG. 2) is performed, the gesture detector 24 measures the capacitance 30 and generates the output signal 32. The gesture algorithm 46 instructs the processor 42 to determine the corresponding command 36.

The processor 42 consults a database 50 of gestures. When the output signal 32 is received, the processor 42 queries the database 50 of gestures. FIG. 3 illustrates the database 50 of gestures as a table 52 that is locally stored in the memory 44 of the controller 30. The database 50 of gestures, however, may be remotely stored, queried, or retrieved from any location, such as in a controller area network (or "CAN") or other communications network. Regardless, the database 50 of gestures maps, associates, or relates different output signals 32 to their corresponding commands 36. The processor 42, for example, compares the output signal 32 to the entries stored in the database 50 of gestures. Should a match be found, the processor 42 retrieves the corresponding command 36. The processor 42 then executes the command 36 in response to the output signal 32, which is generated by the gesture detector 24 in response to the gesture 28.

Figure 4:
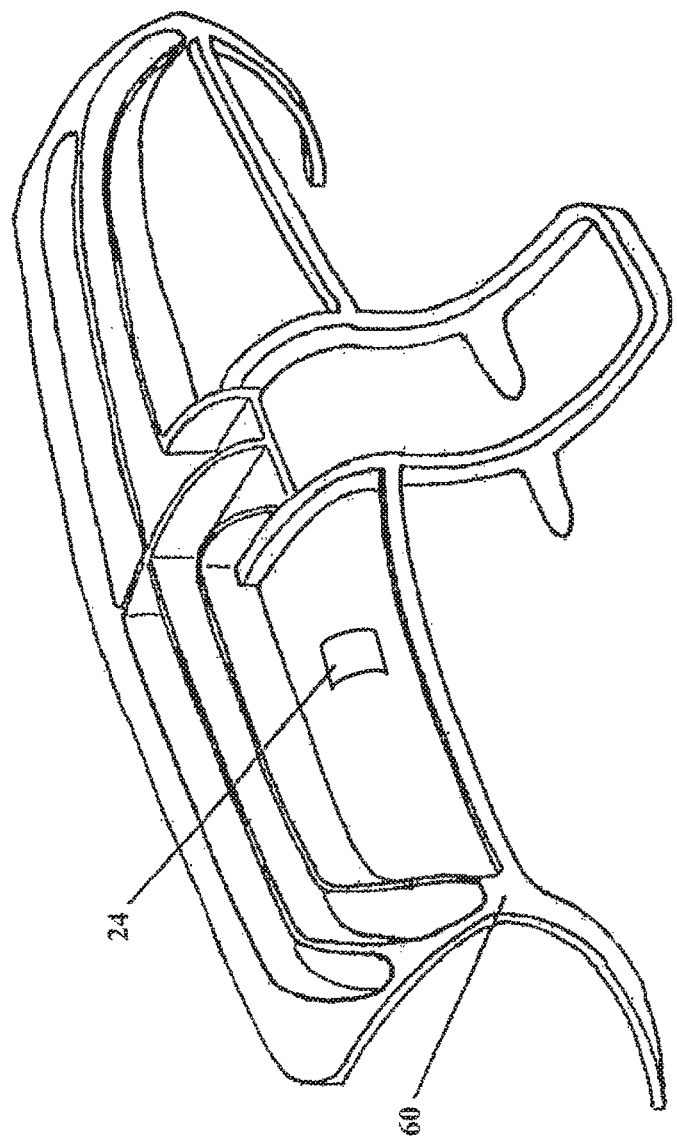
FIGS. 4-5 are schematics illustrating a gesture detector, according to exemplary embodiments.
Figure 5:
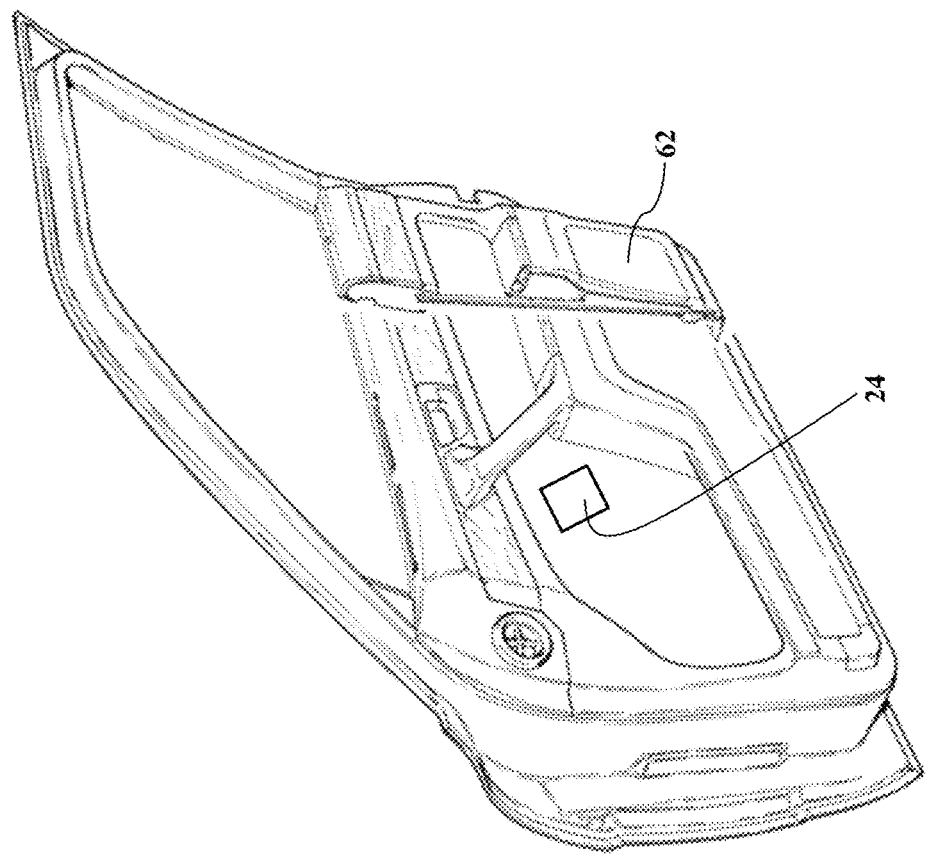

FIGS. 4-5 are more schematics illustrating the gesture detector 24, according to exemplary embodiments. FIG. 4 illustrates the gesture detector 24 located on or in an instrument panel 60, while FIG. 5 illustrates the gesture detector 24 located on or in an interior door panel 62. Indeed, the gesture detector 24 may be located in front seats, back seats, or any other location in which gesture detection is desired.

Figure 6:
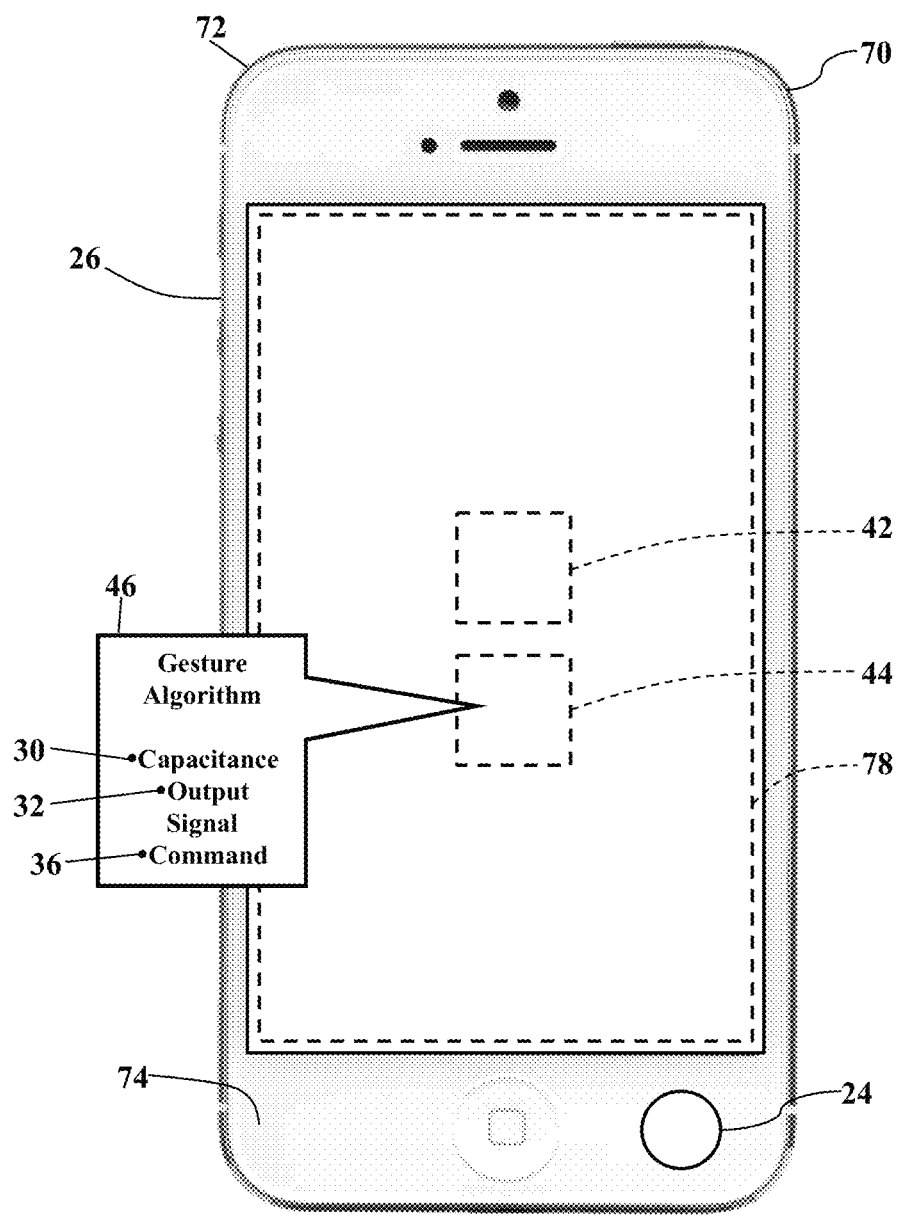
FIGS. 6-7 are more simplified schematics illustrating another exemplary operating environment.
Figure 7:
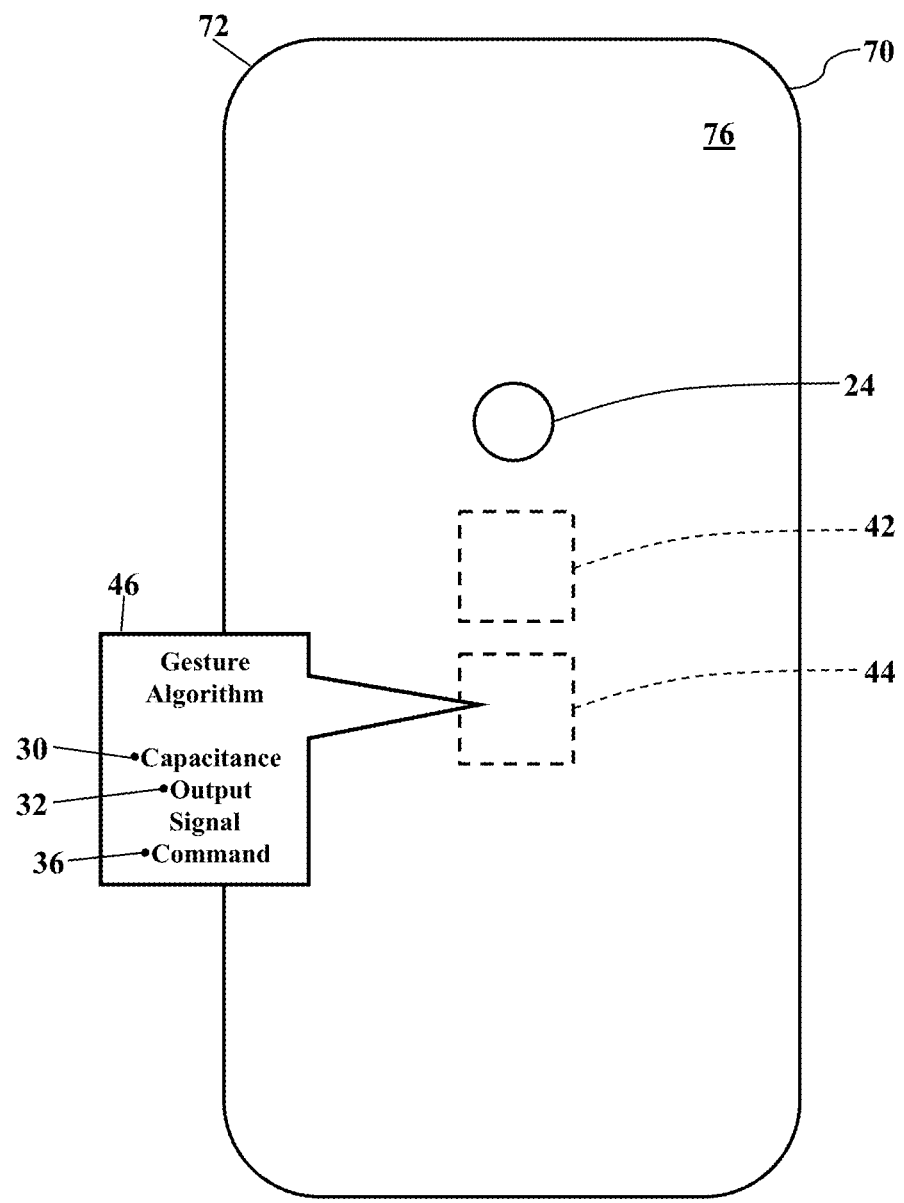

FIGS. 6-7 are more simplified schematics illustrating another exemplary operating environment. Here the gesture detector 24 detects gestures performed in the vicinity of any electronic device 70. The electronic device 70, for simplicity, is illustrated as a smartphone 72. The electronic device 70, however, may be any processor-controlled device, as later paragraphs will explain. Regardless, the smartphone 72 may also have the processor 42 executing the gesture algorithm 46 stored in the memory 44. When a user's hand performs the gesture (illustrated, respectively, as reference numerals 26 and 28 in FIG. 2), the gesture detector 24 senses the capacitance 30 and generates the output signal 32. FIG. 6 illustrates the gesture detector 24 on a front face 74 of the smartphone 72, while FIG. 7 illustrates the gesture detector 24 on a backside 76 of the smartphone 72. Wherever the gesture detector 24 is located, the processor 42 queries for and retrieves the matching command 36. The processor 42 then executes the command 36 in response to the output signal 32. So, even though the smartphone 72 may have a touch-sensing screen 78, the gesture detector 24 senses touch less gestures performed by the user's hand 26. The user may thus perform touch less gestures to access web pages, answer calls, compose texts, and any other commands or actions.

Exemplary embodiments may thus be deployed throughout homes and businesses. The gesture detector 24 may be installed within cars where ambient, dynamic lighting conditions degrade conventional optical recognition techniques. The gesture detector 24, however, may also be installed in communications devices, toys, fixtures, and any other electronic device 70. Because the gesture detector 24 does not rely on light, the gesture detector 24 is thus unaffected by lighting conditions. The gesture detector 24 may thus be deployed throughout homes and businesses to detect and interpret our gestures. The gesture detector 24 may even be combined with or augmented by voice recognition techniques to reduce, or even eliminate, manual activation of controls.

Figure 8:
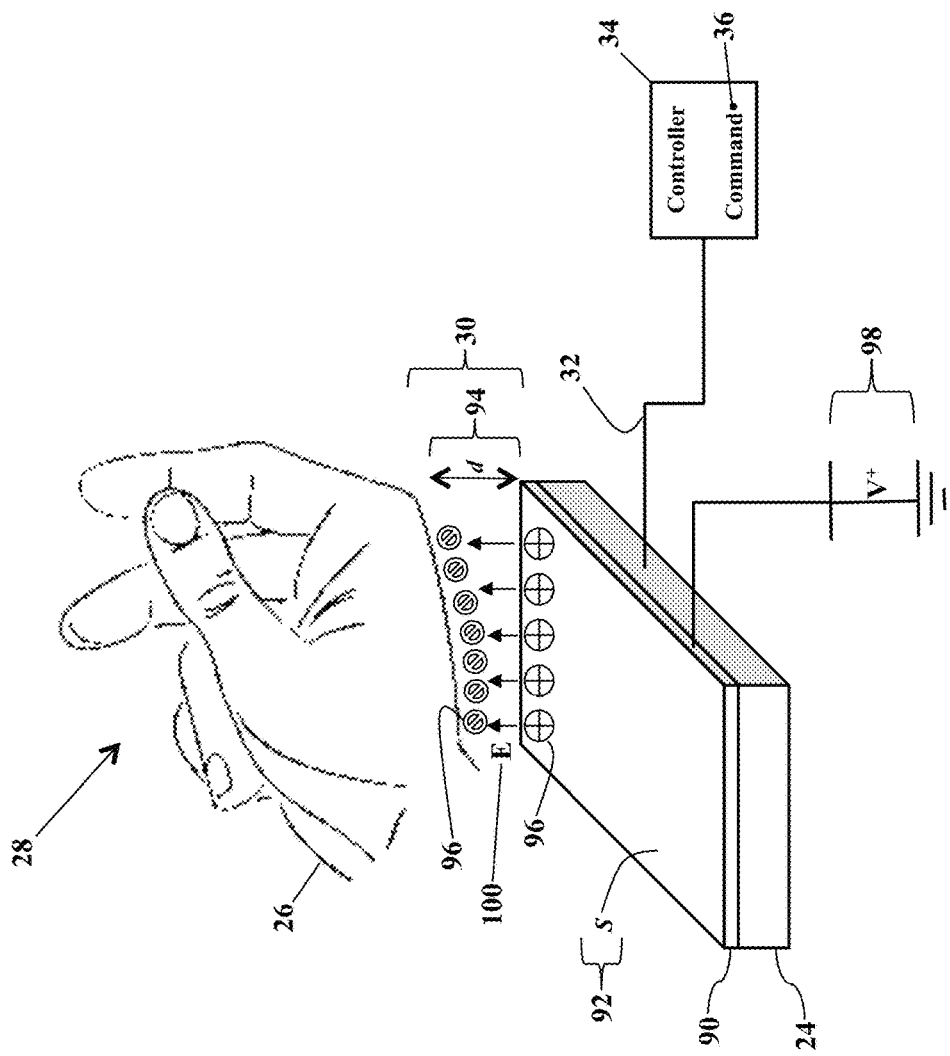
FIGS. 8-9 are more detailed illustrations of the gesture detector, according to exemplary embodiments.
Figure 9:
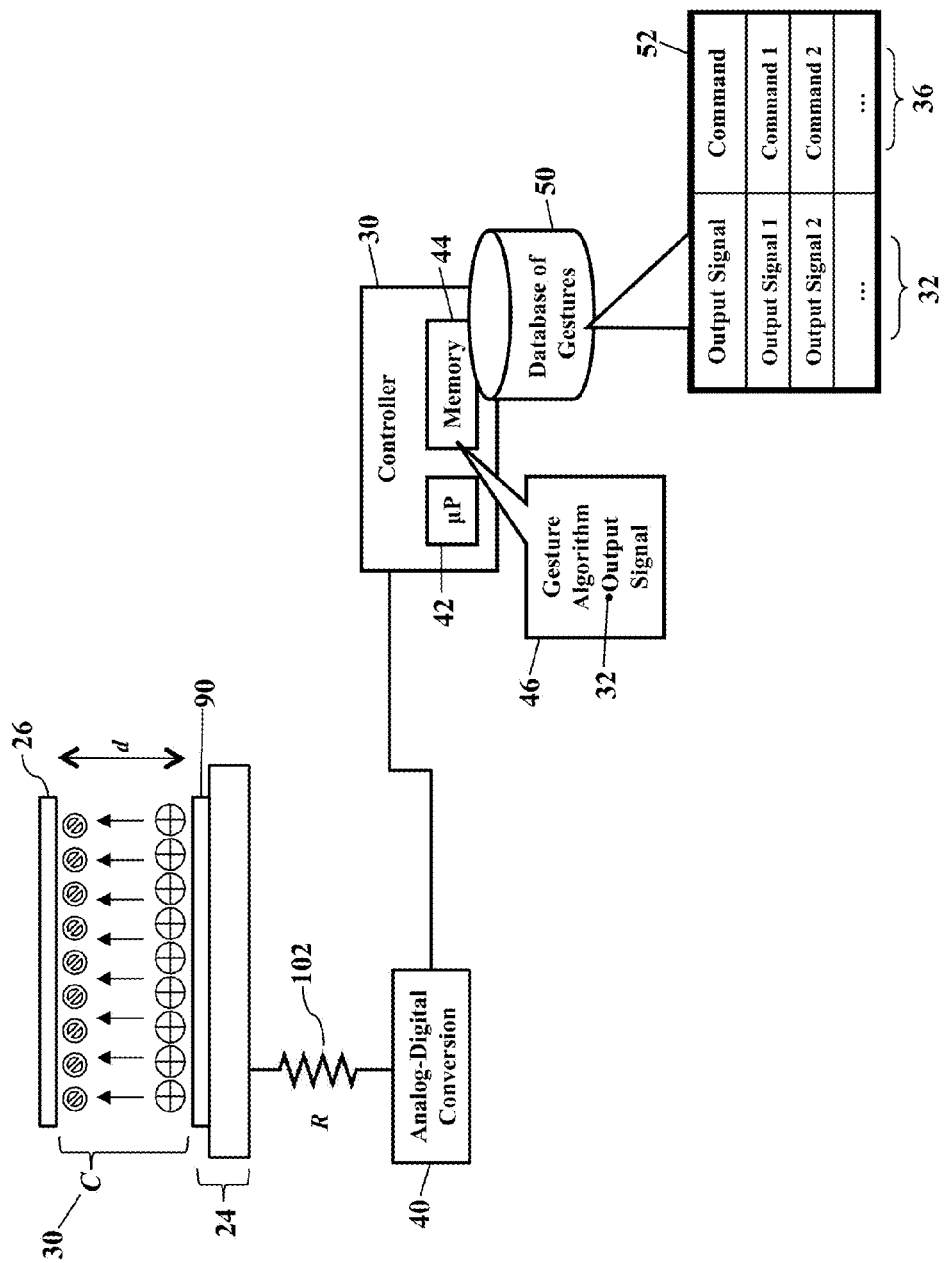

FIGS. 8-9 are more detailed illustrations of the gesture detector 24, according to exemplary embodiments. FIG. 8 illustrates the gesture detector 24 having an electrically conductive plate 90 of area S (illustrated as reference numeral 92). As the user's hand 26 performs the gesture 28, the user's hand 26 is separated by a distance d (illustrated as reference numeral 94) from the plate 90. As the user's hand 26 performs the contactless gesture 28, the movement of the user's hand 26 causes electrical charges 96 to distribute. The electrical charges are grossly enlarged for clarity. Because human skin and tissue are electrically conductive, the electrical charges 96 distribute on the user's skin. The electrical charges 96 also distribute on a surface of the plate 90. For simplicity, only a few electrical charges 96 are illustrated. In practice, though, the electrical charges 96 will distribute all over the user's hand 26, while the electrical charges will distribute all over the plate 90. FIG. 8 illustrates the electrical charges 96 on the user's hand 26 as negatively charged, while the electrical charges 96 on the plate 90 are positively charged. The polarity of the electrical charges 96, however, may be reversed. Regardless, if a voltage difference V (illustrated as reference numeral 98) exists between the user's hand 26 and the plate 90, then an electric field E (illustrated as reference numeral 100) is generated.

FIG. 9 illustrates a simplified schematic. The user's hand 26 is separated by the distance d from the conductive plate 90. Because the user's hand 26 is electrically conductive, this gesture arrangement may be simplified and electrically modeled as a parallel plate capacitor. The voltage difference V is $$V = \frac{Q}{\epsilon S} d,$$

where Q is the charge and E is the permittivity of the air between the user's hand 26 and the plate 90. Knowing the relationship for the capacitance C as $$C = \frac{Q}{V},$$

the capacitance C may be rewritten as $$C = \epsilon \frac{S}{d}.$$

The reader may notice that the capacitance C (illustrated as reference numeral 30) has no dependence on the voltage difference V, nor is the capacitance C dependent on the electrical charge Q (illustrated as reference numeral 96). The reader may also notice that the capacitance C is inversely proportional to the separation distance d. As the user's hand 26 approaches the plate 90, the separation distance d decreases, causing the capacitance C to increase. Conversely, as the user's hand 26 moves away from the plate 90, the separation distance d increases, causing the capacitance C to decrease.

The output signal 32 also changes. As the user's hand 26 vertically moves with respect to the plate 90, the capacitance C changes. Once the electrical charges 96 develop, the electric field E (illustrated as reference numeral 100 in FIG. 8) charges the gesture detector 24 as a capacitor. The gesture detector 24 may then be discharged, through a resistor 102, according to the RC time constant τ=RC, where R is the resistance (in Ohms) of the resistor 102 and C is the capacitance 30. The output signal 32 will thus decay with time according to $$V(t)=V_o(e^{-t/\tau}).$$

Because the capacitance C changes as the user's hand 26 performs the gesture, the time constant τ=RC will also change, causing the output signal 32 to change with the same gesture. So, as the user's hand 26 performs the gesture 28, the capacitance C changes and the output signal 32 also changes. If the output signal 32 is analog, the output signal 32 may be converted by the analog-to-digital converter 40 before being interpreted by the processor 42. The processor 42 receives the output signal 32, queries the database 50 of gestures, and executes the corresponding command 36, as earlier paragraphs explained.

Figure 10:
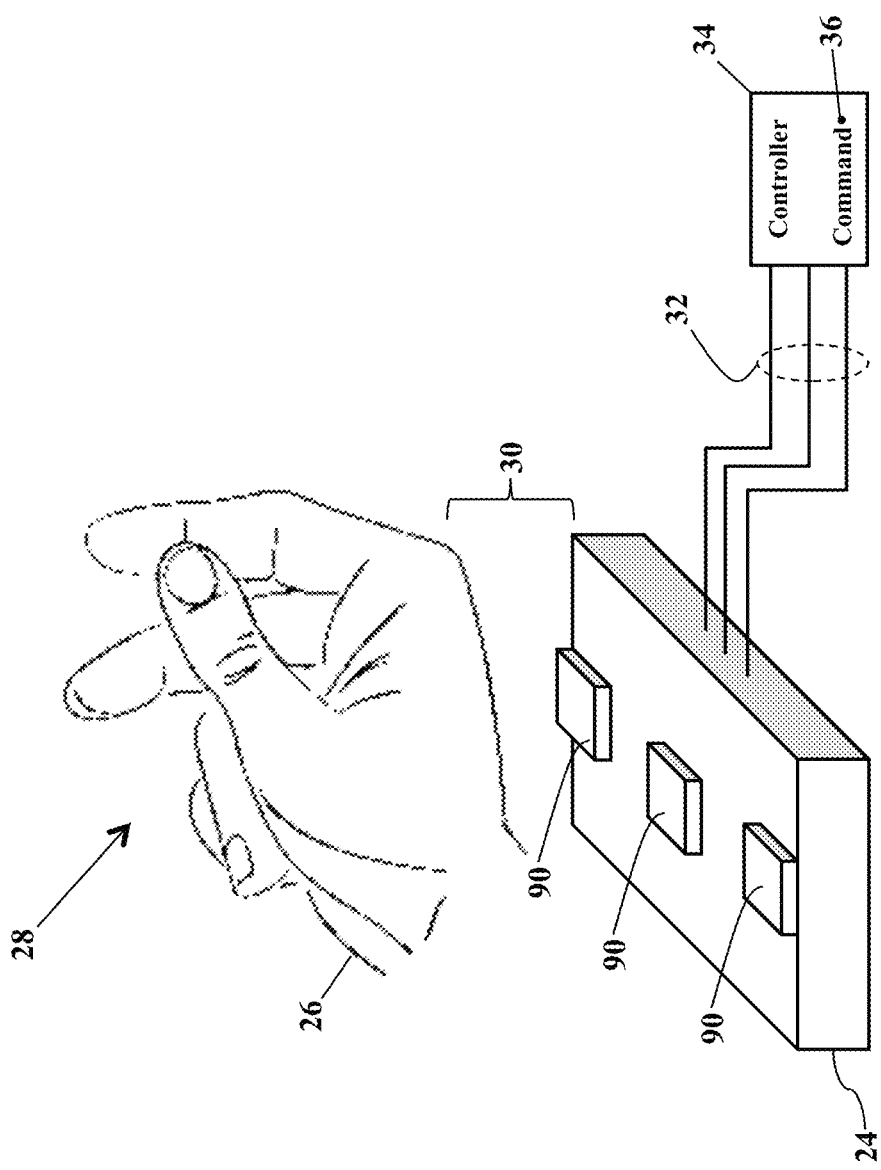
FIGS. 10-11 are more detailed schematics of the gesture detector, according to exemplary embodiments.
Figure 11:
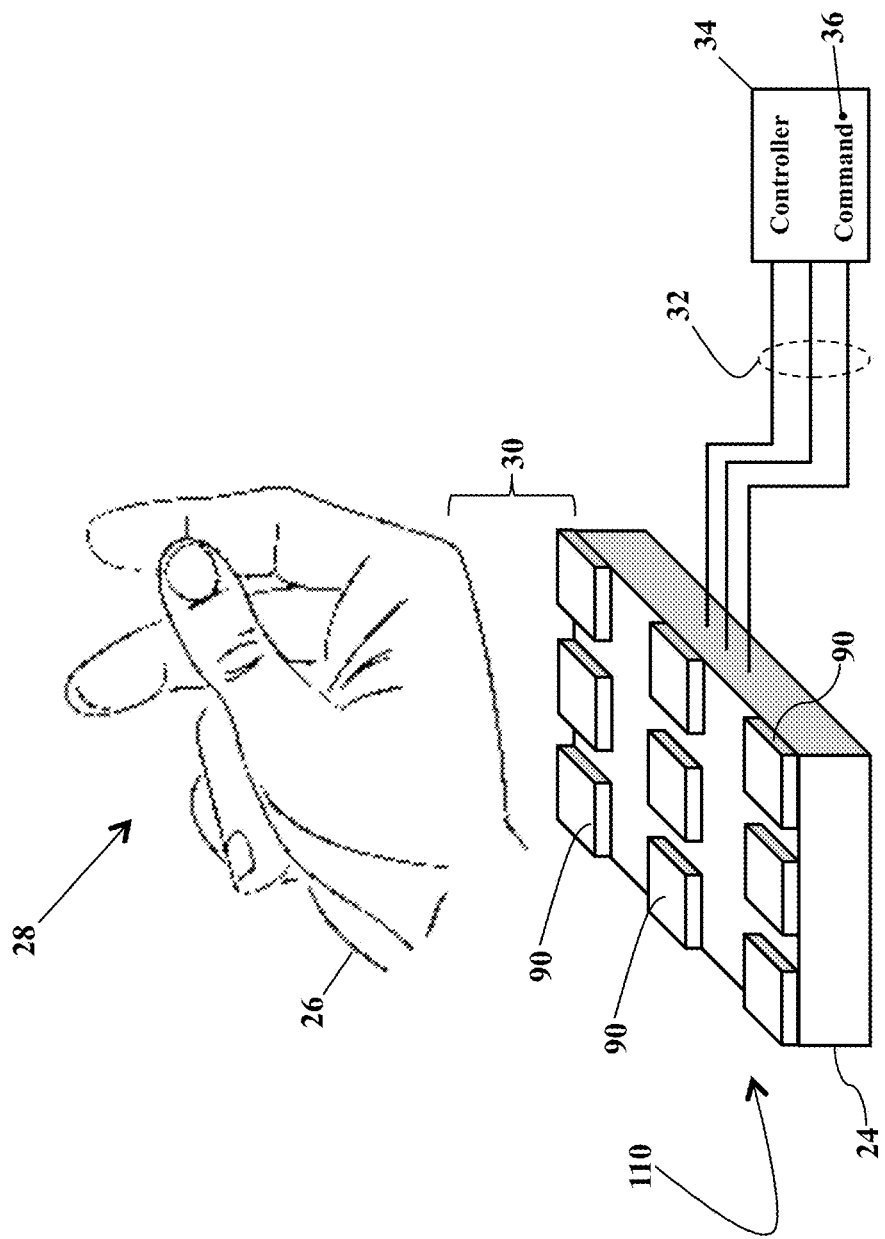

FIGS. 10-11 are more detailed schematics of the gesture detector 24, according to exemplary embodiments. Here the gesture detector 24 may have multiple plates 90 for sensing difference capacitances during performance of the gesture 28. As FIG. 10 illustrates, the gesture detector 24 may have a co-planar, linear arrangement of individual plates 90. As the user's hand 26 performs the gesture 28, the capacitance C (illustrated as reference numeral 30) changes. Each plate 90 may individually generate its corresponding output signal 32 in response to the capacitance C. Multiple output signals 32 may be individually received by the processor 42 for interpretation. The multiple output signals 32, however, may be combined in any way. The multiple output signals 32, for example, may be summed to yield a summed output signal. The multiple output signals 32 may be multiplexed according to time to yield a multiplexed output signal. The multiple output signals 32 may be averaged according to time to yield an averaged output signal. However the multiple output signals 32 are combined, the processor 42 interprets the output signals 32 and executes the corresponding command 36.

FIG. 11 illustrates an array 110 of the plates 90. Here the gesture detector 24 may have the multiple plates 90 arranged as a co-planar grid of rows and columns. As the user's hand 26 performs the gesture 28, the capacitance C (illustrated as reference numeral 30) changes. The processor 42 may interpret each individual output signal 32 or any combination of the multiple output signals 32. The processor 42 then executes the corresponding command 36.

Figure 12:
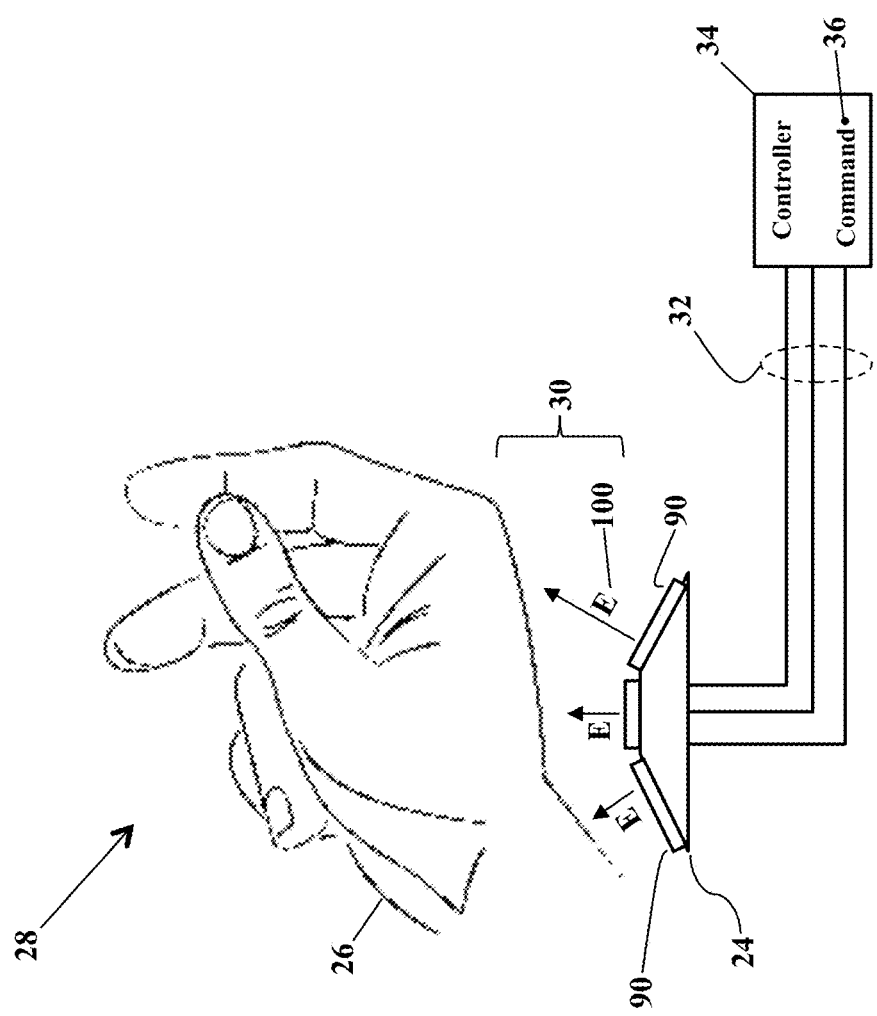
FIGS. 12-13 are diagrams illustrating a curvilinear arrangement of the gesture detector, according to exemplary embodiments.
Figure 13:
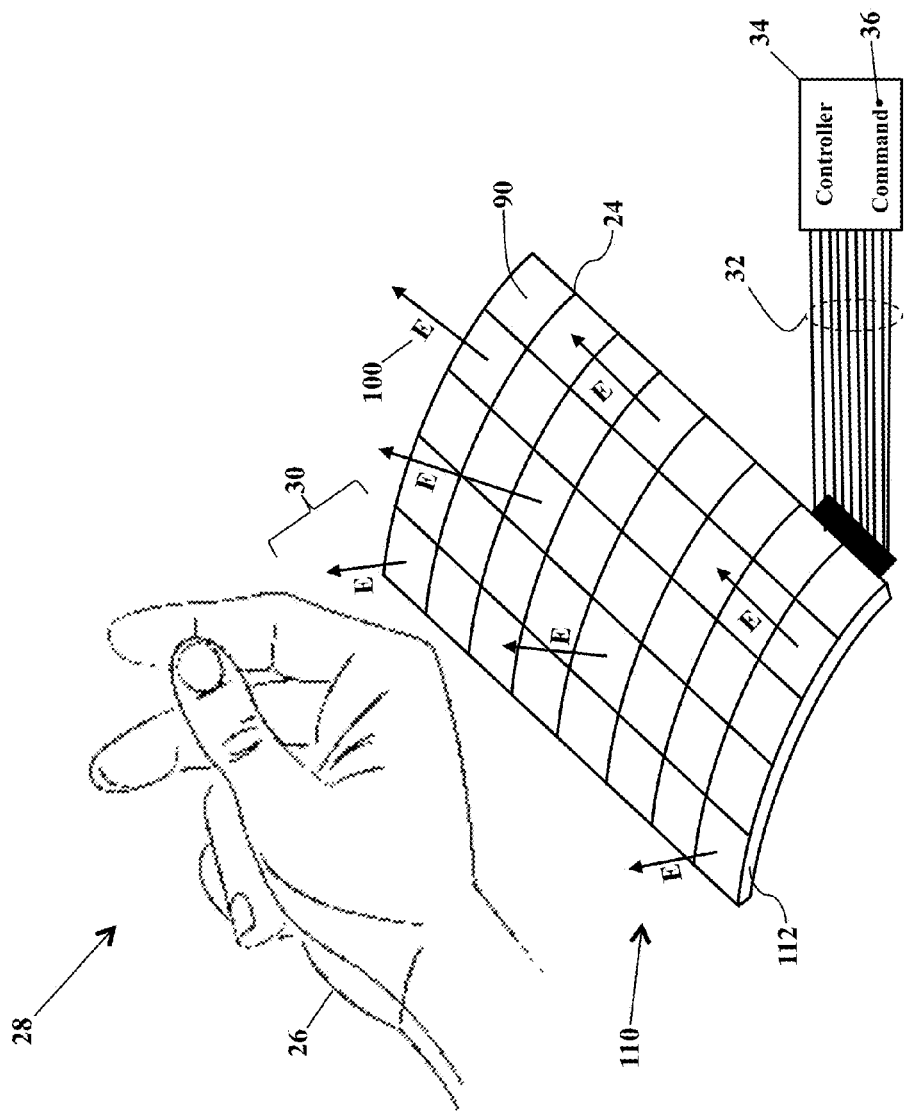

FIGS. 12-13 are diagrams illustrating a curvilinear arrangement of the gesture detector 24, according to exemplary embodiments. Here the gesture detector 24 may have the multiple plates 90, but the plates 90 need not lie in the same plane. Some of the plates 90 may lie in the same plane, while other plates 90 may be arranged or oriented in one or more different planes. Recalling the automotive interior illustrated in FIGS. 1 and 4-5, the plates 90 may be installed on curved or curvilinear surfaces of the center console 22, the instrument panel 60, and the door panel 62. Likewise, the plates 90 may be arranged on the sleek, curved surfaces of the electronic device 70 illustrated in FIGS. 5-6. Indeed, the plates 90 may have many different orientations to each other. FIG. 13, in particular, illustrates a flexible substrate 112 on which the plates 90 may be printed, using conductive ink, in the grid or array 110. While FIGS. 12-13 only illustrate a few or several plates 90, in practice the array 110 may contain hundreds, perhaps thousands or millions, of plates 90 using semiconductor micro or nanotechnology manufacturing. The convex, curvilinear arrangement of the plates 90 increases sensitivity of the gesture detector 24 to the gesture 28. As the user's hand 26 performs the contactless gesture 28, the electric field E (illustrated as reference numeral 100) is everywhere perpendicular to each plate 90. As the multiple plates 90 may be curvilinearly arranged, each different plate 90 produces a different output signal 32. The different output signals 32 thus allow exemplary embodiments to detect proximity to the user's hand 26 using many different vector representations of many different electric fields E. Conventional two-dimensional planar arrangements yield an identical vector representation, providing little data for differentiating the user's different gestures 28. The curvilinear, three-dimensional arrangement, in contradistinction, generates many different output signals 32, albeit normal to each plate 90, that provides much more data. Indeed, exemplary embodiments provide volumetric data describing the user's hand 26 performing each different gesture 28, thus increasing sensitivity of different gestures. The gesture detector 24 may thus be any arrangement of three-dimensional capacitive plates 90 for sensing the capacitance 30 during the gesture 28. The multiple plates 90, however, may also be curvilinearly concave in arrangement, depending on the atheistic design of the underlying interior (such as the center console 22).

Figure 14:
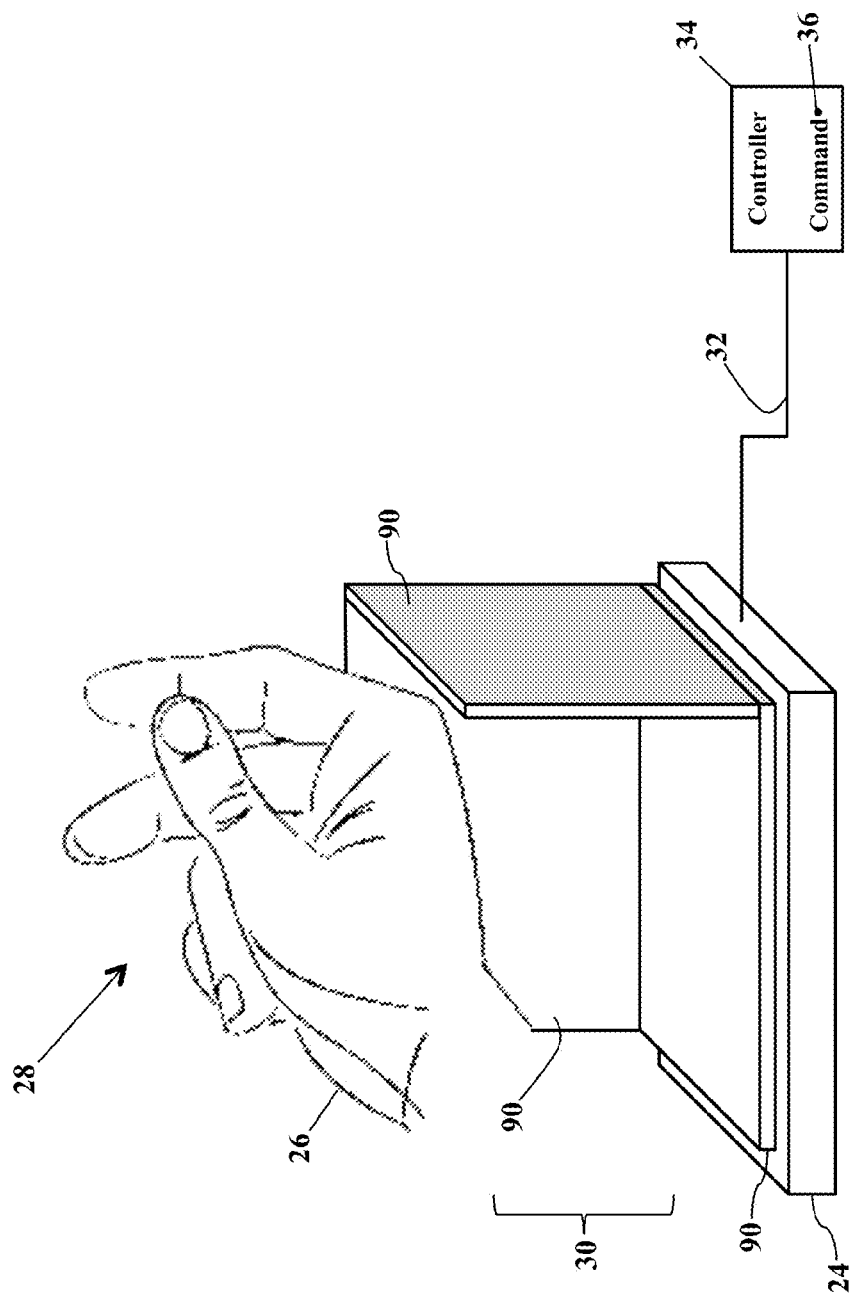
FIG. 14 is another schematic illustrating the gesture detector, according to exemplary embodiments.

FIG. 14 is another schematic illustrating the gesture detector 24, according to exemplary embodiments. Here the gesture detector 24 has three (3) orthogonal plates 90. As the user's hand 26 performs the gesture 28, each plate 90 measures its corresponding capacitance 30. The gesture detector 24 may thus sense the capacitance 30 in three dimensions, plus time. The processor 42 may interpret each individual output signal 32 or any combination of the multiple output signals 32. The processor 42 then executes the corresponding command 36.

Figure 15:
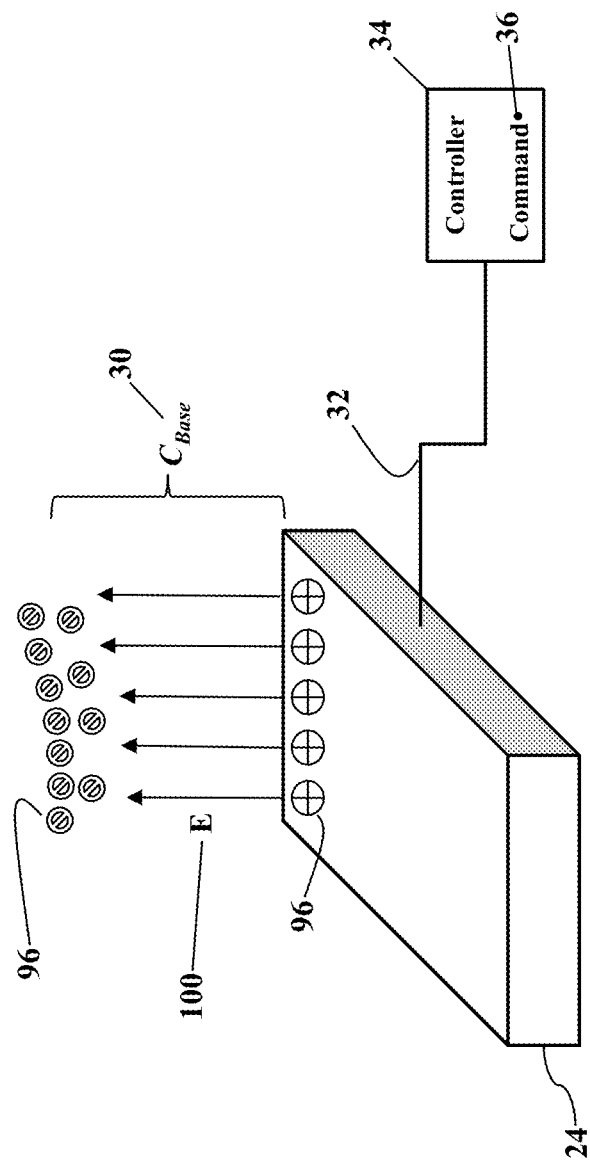
FIGS. 15-17 are schematics illustrating a learning mode of operation, according to exemplary embodiments.
Figure 16:
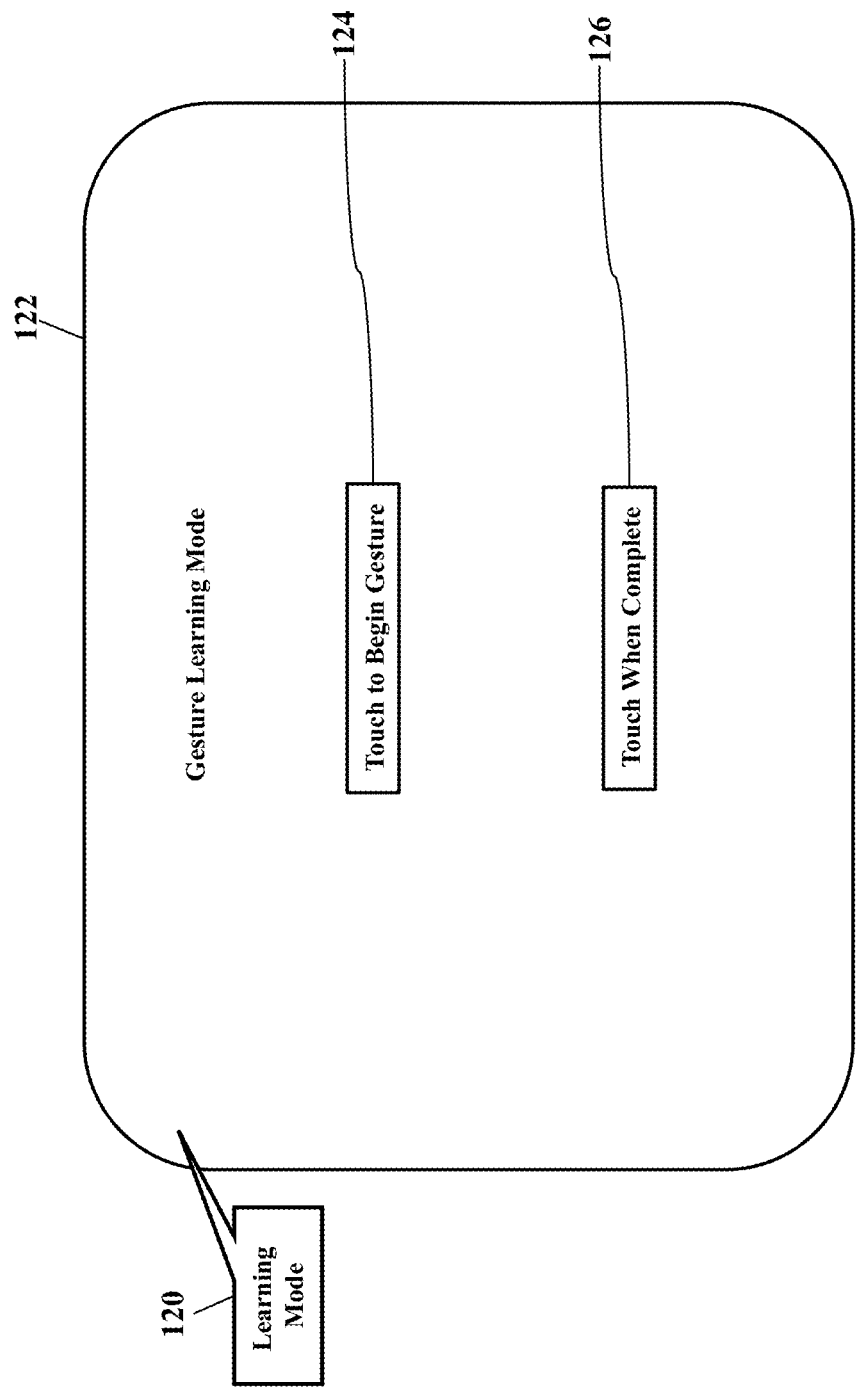
Figure 17:
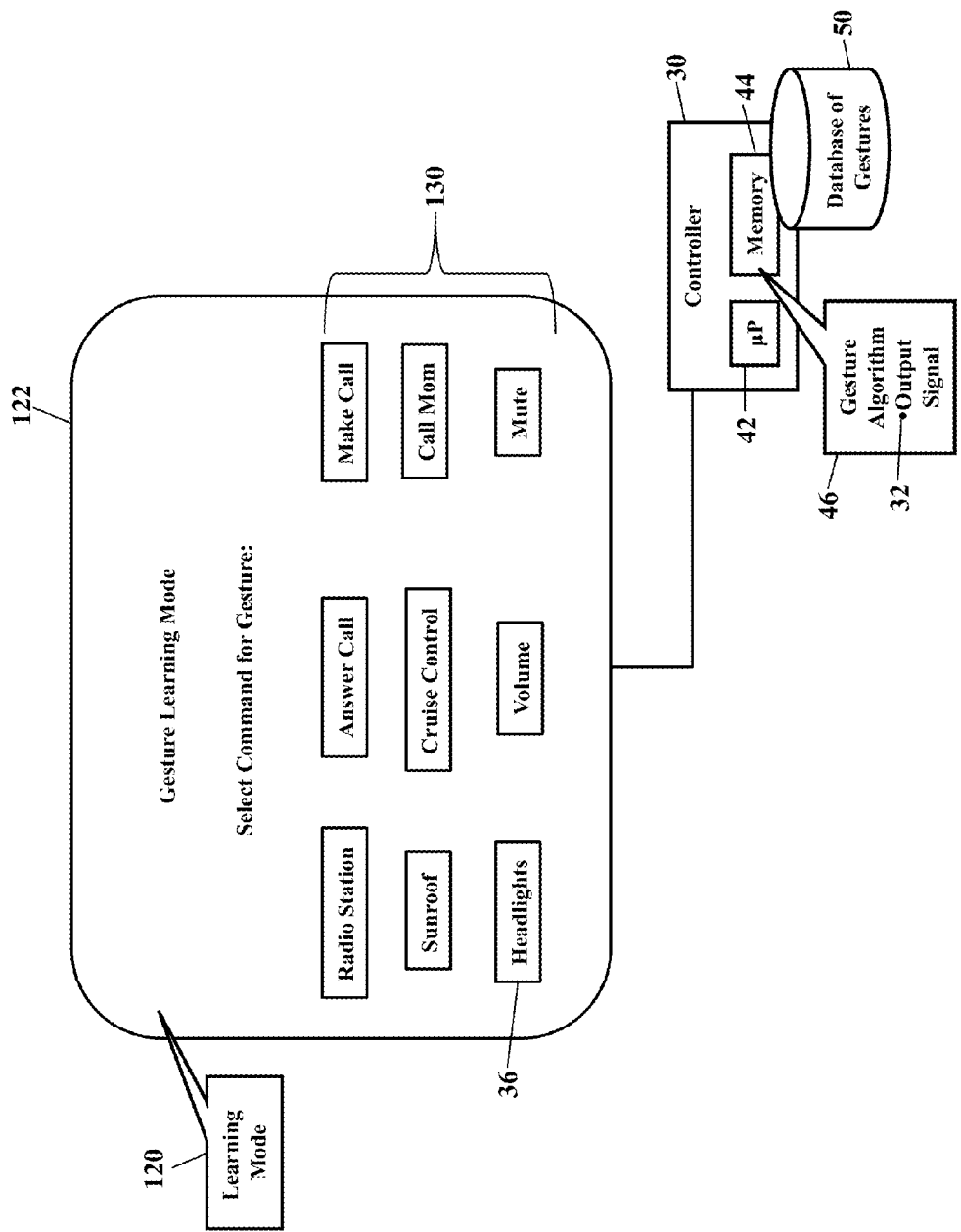

FIGS. 15-17 are schematics illustrating a learning mode 120 of operation, according to exemplary embodiments. Before the processor 42 can interpret the user's gestures, the processor 42 may be taught to recognize the gestures. FIG. 15 thus illustrates a baseline capacitance $C_{Base}$ (again illustrated as the reference numeral 30). The gesture detector 24 may first measure the baseline capacitance 30 of the ambient environment. Even though the user's hand (illustrated as reference numeral 26 in FIGS. 12-14) may not be near the gesture detector 24, ambient electrical charges 96 may still cause the gesture detector 24 to sense some ambient, baseline capacitance 30. Stray electrical charges in the air and/or on the surface of the plate 90, for example, may create the baseline capacitance 30. The processor 42 may thus receive the output signal 32 generated from the ambient conditions.

FIG. 16 illustrates a graphical user interface 122. The graphical user interface 122 may be displayed on any display device (such as in the center console 22 of the automotive environment 20, illustrated in FIG. 1). The graphical user interface 122, of course, may be displayed on any other apparatus, such as the mobile smartphone (illustrated as reference numeral 72 in FIG. 6). Regardless, here the user trains the processor 42 to recognize particular touchless gestures performed above the gesture detector 24. When the user wishes to store a gesture for later recognition, the user may first select the learning mode 120 of operation. As FIG. 16 illustrates, the graphical user interface 122 may visually prompt 124 the user to perform a gesture above the gesture detector 24. The user then performs the desired two-dimensional or even three-dimensional movement. As the gesture is performed, the gesture detector 42 senses the capacitance 30 and generates the output signal 52. The gesture algorithm 46 causes the processor 42 to read and store the output signal 32 in the memory 44. Once the gesture is complete, the user selects the completion icon 124.

Baseline comparisons may then be made. As the user performs the gesture, exemplary embodiments may compare the baseline capacitance $C_{Base}$ to the output signal 32. That is, exemplary embodiments may compare the output signal 32 to the baseline measurements of the ambient environment. Any change may then be used to retrieve the corresponding command 36.

FIG. 17 illustrates a menu 130 of the commands 36. The menu 130 is stored and retrieved from the memory (discussed and illustrated above as reference numeral 44). The menu 130 is processed for display, thus allowing the user to select the command 36 that corresponds to the just-performed gesture. Once the user confirms completion of the gesture, the user may then associate one of the commands 36 to the gesture. The menu 130 thus contains a selection of different commands 36 from which the user may choose. FIG. 17 only illustrates a few popular commands 36 for the automotive environment. In practice, though, the menu 130 may be a much fuller listing of commands for any operating environment. The user touches or selects the command 36 that she wishes to associate to the gesture (e.g., the output signal 32). Once the user makes her selection, the processor 42 adds a new entry to the database 50 of gestures. The database 50 of gestures is thus updated to associate the output signal 32 to the command 36 selected from the menu 130. The user may thus continue performing different gestures, and associating different commands, to populate the database 50 of gestures.

The database 50 of gestures may also be prepopulated. As the gesture detector 24 may be adapted to any electronic device or environment, a manufacturer or retailer may preload the database 50 of gestures. Gestures may be predefined to invoke or call commands, functions, or any other action. The user may then learn the predefined gestures, such as by viewing training tutorials. The user may also download entries or updates to the database 50 of gestures. A server, accessible from the Internet, may store predefined associations that are downloaded and stored to the memory 44.

Figure 18:
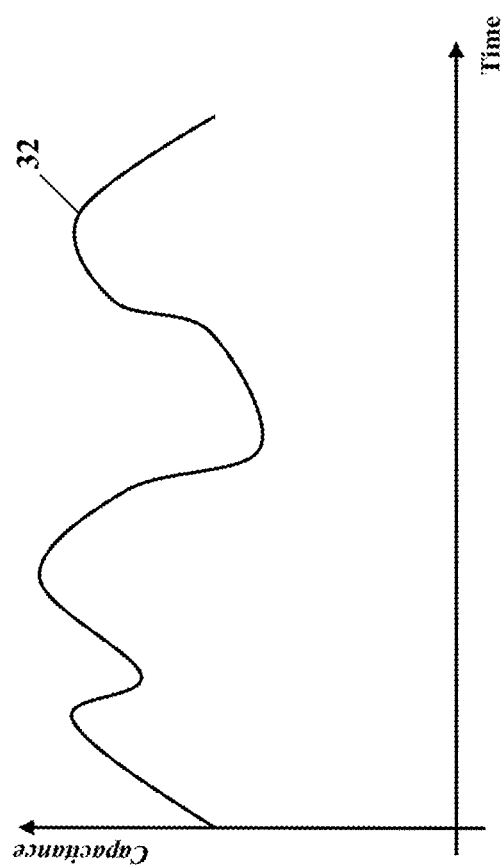
FIGS. 18-20 are schematics illustrating output sampling, according to exemplary embodiments.
Figure 19:
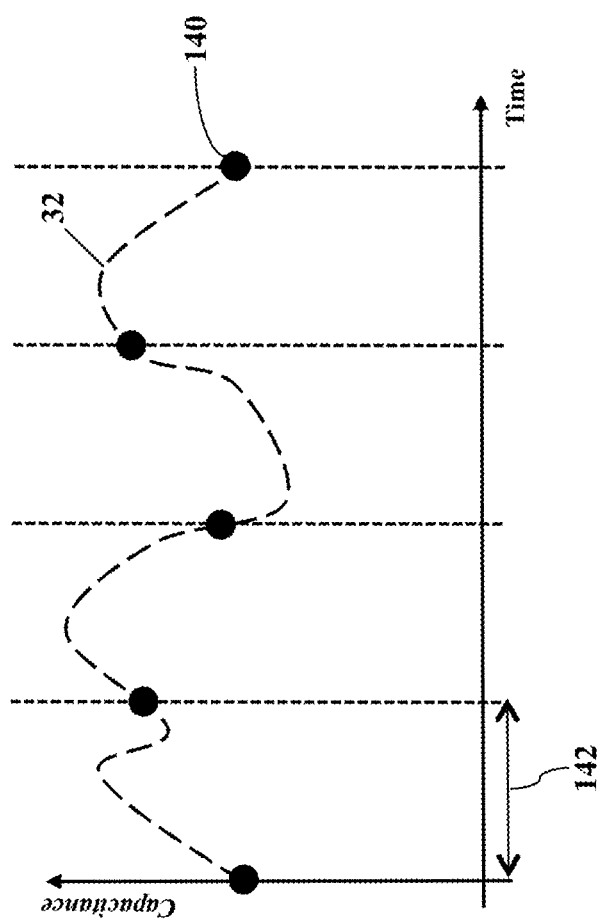
Figure 20:
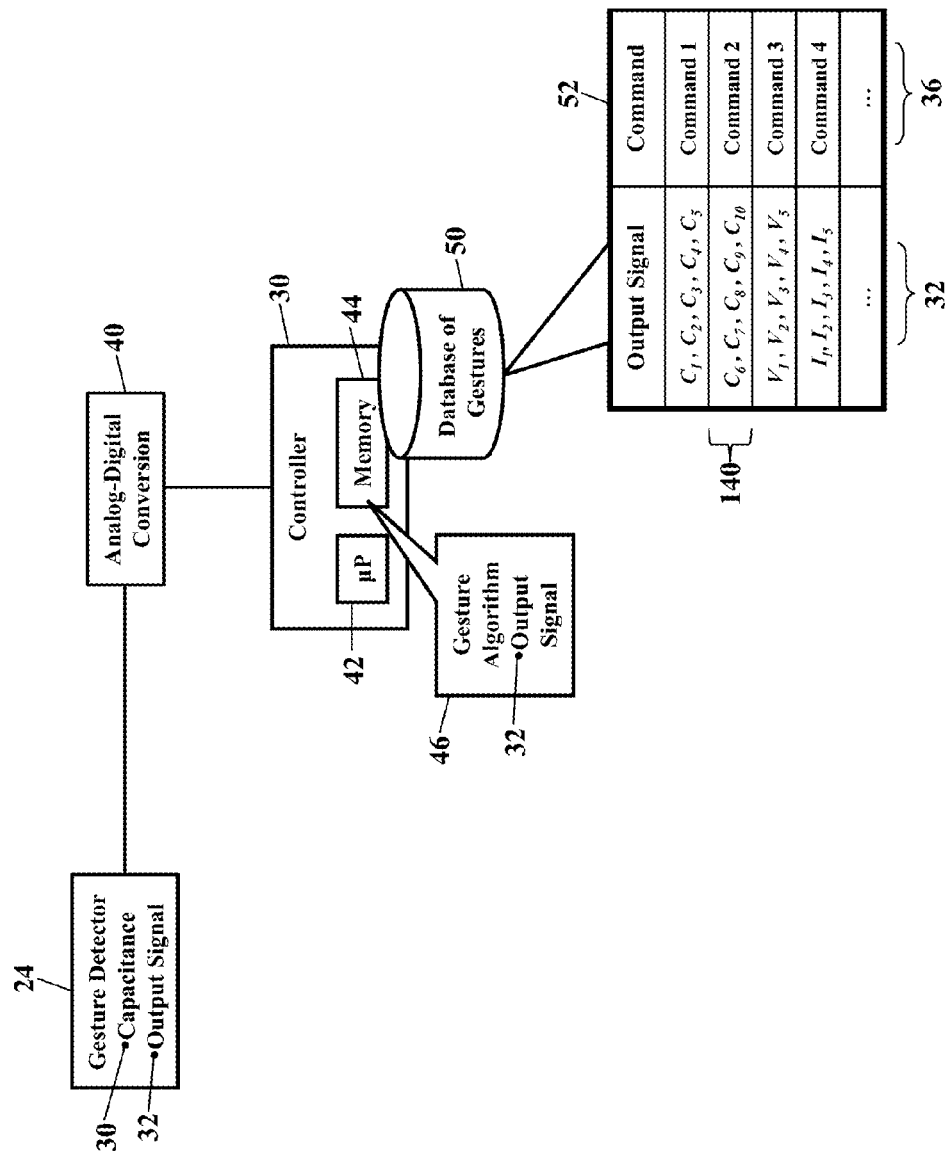

FIGS. 18-20 are schematics illustrating output sampling, according to exemplary embodiments. Whatever gesture the user performs, the gesture detector (discussed and illustrated above as reference numeral 24) generates the output signal 32. The output signal 32 may be the capacitance 30, the time constant $\tau = RC$, the decaying voltage measurement, or a decaying current measurement, depending on the circuit design. Regardless, the output signal 32 may be too complex for fast processing. For example, FIG. 18 illustrates a graph of the output signal 32 for an exemplary gesture having a one second (1 sec.) duration. Even though the gesture is only one second in duration, the output signal 32 may be too complex for quick and efficient processing. The processor 42, in other words, may require more time than desired to process the output signal 32.

FIG. 19 illustrates sampling of the output signal 32. Exemplary embodiments may sample the output signal 32 to produce discrete data points 140 according to some sampling rate 142. For mathematical simplicity, the sampling rate 142 is assumed to be 0.2 seconds, which may be adequate for human gestures. So, when the user performs the gesture having the one second duration, the output signal 32 may be sampled every 0.2 seconds to yield five (5) data points 140.

FIG. 20 again illustrates the database 50 of gestures. Because the output signal 32 may be sampled, the database 50 of gestures need only store the discrete data points 140 sampled from the output signal 32. FIG. 20 thus illustrates each sampled output signal 32 as a collection or set of the discrete data points 140. When the database 50 of gestures is queried, exemplary embodiments need only match the sampled values. Exemplary embodiments need not match an entire, continuous capacitance, voltage, or current signal. The burden on the processor 42 is thus reduced, yielding a quicker response to the user's gesture input.

Figure 21:
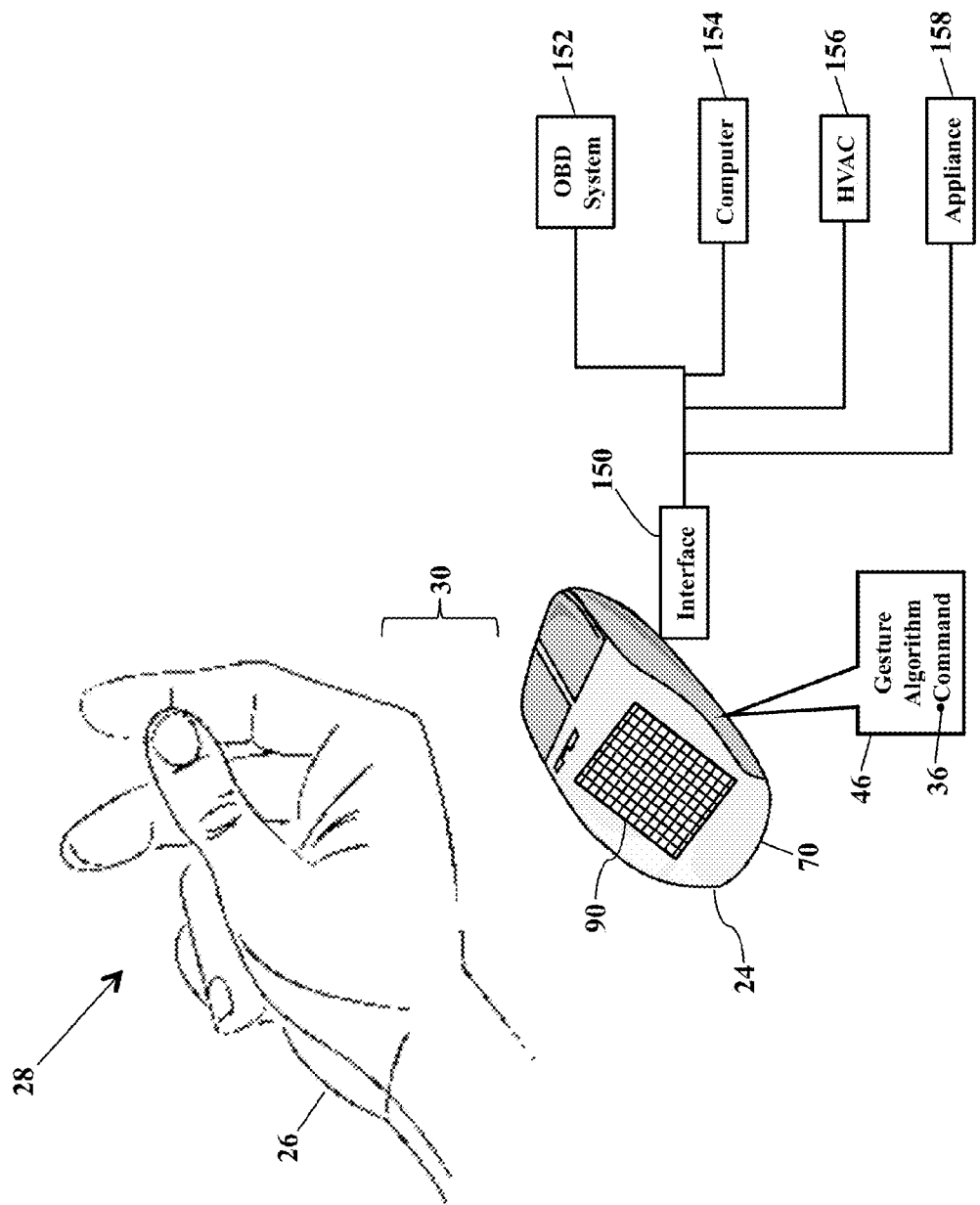
FIG. 21 is a schematic illustrating an aftermarket gesture detector, according to exemplary embodiments.

FIG. 21 is a schematic illustrating an aftermarket gesture detector 24, according to exemplary embodiments. Here the gesture detector 24 may be self-contained, aftermarket component that interprets gestures into their corresponding commands 36. The gesture detector 24 may thus include the processor and memory (not shown for simplicity). The gesture detector 24 is thus preferably a small component that may be purchased to add gesture detection to an existing system. FIG. 21, for example, illustrates the gesture detector 24 as a computer-like tactile mouse, even one or more having control buttons. A surface of the computer-like mouse may have the plates 90 printed onto, or affixed thereon, the surface. The gesture detector 24, for example, may interface with the driver's vehicle, computer, television, or any other electronic device 70. The gesture detector 24 thus has an interface 150 for sending the determined command 36 to the existing system. The gesture detector 24, for example, may physically plug into a vehicle's on-board diagnostic ("OBD") system 152 ("OBD") and send the command 36 to the vehicle's intelligence for execution. The gesture detector 24, however, may utilize the vehicle's BLUETOOTH® interface for sending the command 36 to the vehicle's intelligence for execution. Similarly, the gesture detector 24 may have the interface 150 to a computer 154, television, or any other audio-video component. The gesture detector 24 may thus be laid on a table or counter to interpret gestures into commands for an HVAC system 156 or appliance 158.

Exemplary embodiments may also be applied to jewelry and other adornment. As wearable devices become common, jewelry will evolve as a computing platform. An article of jewelry, for example, may be instrumented with the gesture detector 24, thus enabling inputs across a surface of the jewelry. Moreover, as the gesture detector 24 may be small and adhesively adhered, exemplary embodiments may be applied or retrofitted to heirloom pieces and other existing jewelry, thus transforming older adornment to modern, digital usage.

Figure 22:
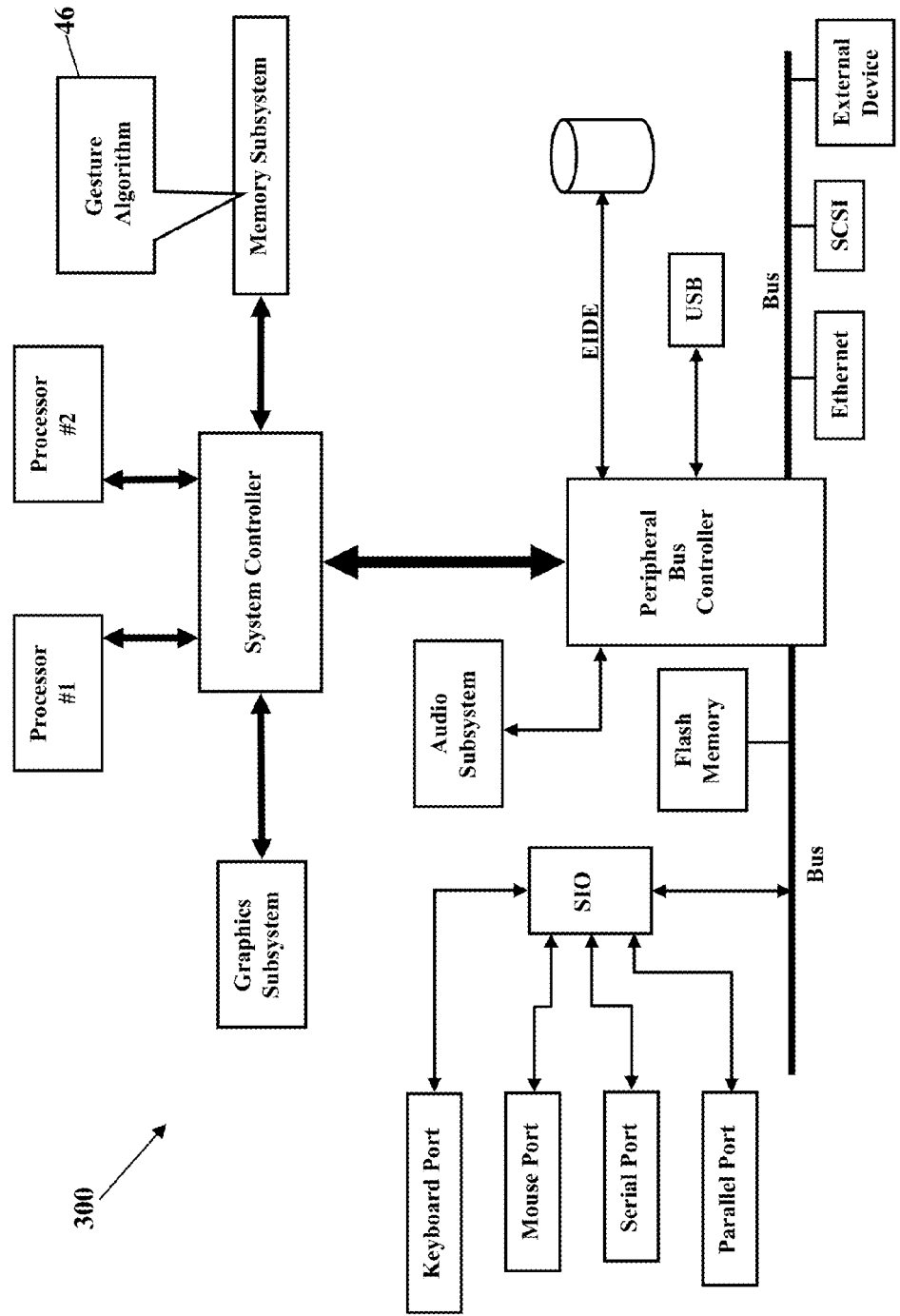
FIGS. 22-23 are schematics illustrating other operating environments for additional aspects of the exemplary embodiments.

FIG. 22 is a schematic illustrating still more exemplary embodiments. FIG. 22 is a generic block diagram illustrating the gesture algorithm 46 operating within a processor-controlled device 300. As the above paragraphs explained, the gesture algorithm 46 may operate in any processor-controlled device 300. FIG. 22, then, illustrates the gesture algorithm 46 stored in a memory subsystem of the processor-controlled device 300. One or more processors communicate with the memory subsystem and execute the gesture algorithm 46. Because the processor-controlled device 300 illustrated in FIG. 22 is well-known to those of ordinary skill in the art, no detailed explanation is needed.

Figure 23:
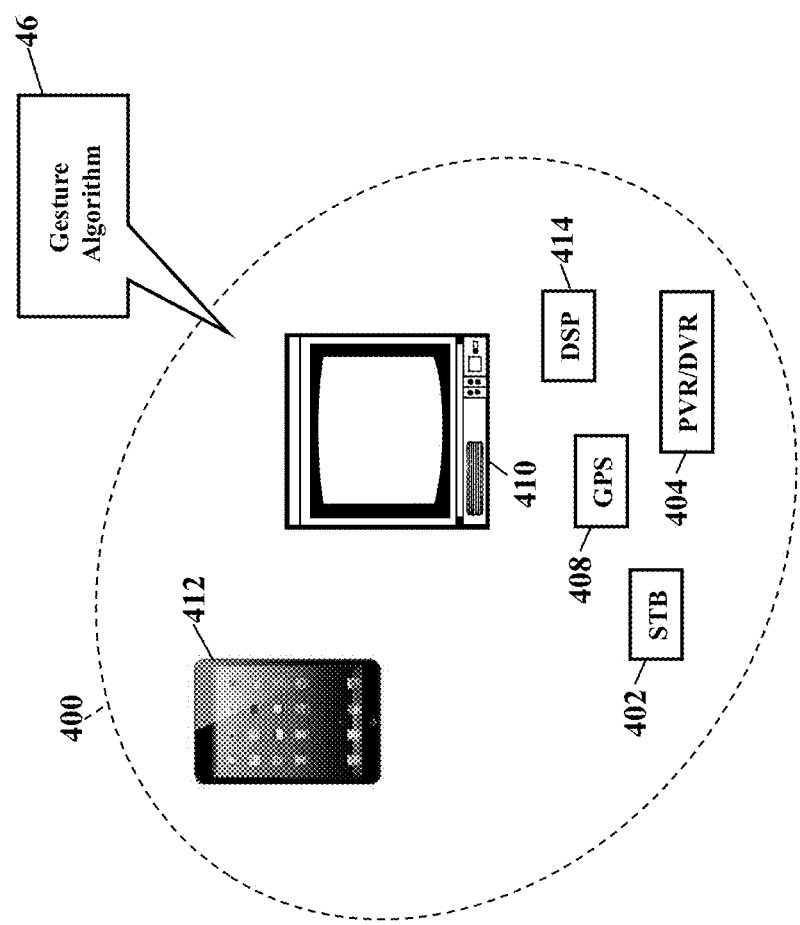

FIG. 23 depicts other possible operating environments for additional aspects of the exemplary embodiments. FIG. 23 illustrates the gesture algorithm 46 operating within various other devices 400. FIG. 23, for example, illustrates that the gesture algorithm 46 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor 50 and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for detecting gestures, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving a plurality of output signals generated by a three-dimensional curvilinear capacitive sensor during performance of a contactless gesture with a user's hand, the three-dimensional curvilinear capacitive sensor comprising a plurality of curvilinearly arranged plates for the generation of an electric field by the curvilinearly arranged plates during the performance of the contactless gesture, such that the electric field generated is perpendicular to each curvilinearly arranged plate, wherein adjacent ones of the plurality of the curvilinearly arranged plates have a different orientation as to each other, and the output signals being indicative of a capacitance between the three-dimensional curvilinear capacitive sensor and the user's hand;
retrieving one command of a plurality of different commands, the one command retrieved being associated with the plurality of output signals; and
executing, by a processor, the one commands retrieved in response to the performance of the contactless gesture.

2. The method of claim 1, further comprising comparing an output signal to a baseline value.

3. The method of claim 2, wherein the different orientation between the adjacent ones of the plurality of the curvilinearly arranged plates includes at least a height difference.

4. The method of claim 1, wherein each curvilinearly arranged plate produces one particular output signal of the plurality of output signals, and each output signal is different from one another.

5. The method of claim 1, further comprising sending the one command of the plurality of different commands to an on-board diagnostic system in a vehicle.

6. The method of claim 1, wherein the plurality of curvilinearly arranged plates lie in more than one plane and are arranged in one of a convex and a concave arrangement.

7. The method of claim 6, wherein the plurality of output signals provide volumetric data describing the user's hand.

8. A gesture detector, comprising:
a processor; and
memory storing instructions that when executed cause the processor to perform operations, the operations comprising:
receiving a plurality of output signals generated by a three-dimensional curvilinear capacitive sensor during performance of a contactless gesture with a user's hand, the three-dimensional curvilinear capacitive sensor comprising a plurality of curvilinearly arranged plates for the generation of an electric field by the curvilinearly arranged plates during the performance of the contactless gesture, such that the electric field generated is perpendicular to each curvilinearly arranged plate, wherein adjacent ones of the plurality of the curvilinearly arranged plates have a different orientation as to each other, and the output signals being indicative of a capacitance between the three-dimensional curvilinear capacitive sensor and the user's hand;
retrieving one command of a plurality of different commands, the one command retrieved being associated with the plurality of output signals; and
executing the one commands retrieved in response to the performance of the contactless gesture.

9. The gesture detector of claim 8, wherein the operations further comprise comparing an output signal to a baseline value.

10. The gesture detector of claim 9, wherein the different orientation between the adjacent ones of the plurality of the curvilinearly arranged plates includes at least a height difference.

11. The gesture detector of claim 10, further comprising associating the change to the one command of the plurality of different commands.

12. The gesture detector of claim 8, further comprising sending the one command of the plurality of different commands to an on-board diagnostic system in a vehicle.

13. The gesture detector of claim 8, wherein each curvilinearly arranged plate produces one particular output signal of the plurality of output signals, and each output signal is different from one another.

14. The gesture detector of claim 13, wherein the plurality of output signals provide volumetric data describing the user's hand.

15. A non-transitory computer-readable medium storing computer program instructions for gesture detection, the computer program instructions, when executed on a processor, cause the processor to perform operations comprising:
receiving a plurality of output signals generated by a three-dimensional curvilinear capacitive sensor during performance of a contactless gesture with a user's hand, the three-dimensional curvilinear capacitive sensor comprising a plurality of curvilinearly arranged plates for the generation of an electric field by the curvilinearly arranged plates during the performance of the contactless gesture, such that the electric field generated is perpendicular to each curvilinearly arranged plate, wherein adjacent ones of the plurality of the curvilinearly arranged plates have a different orientation as to each other, and the output signals being indicative of a capacitance between the three-dimensional curvilinear capacitive sensor and the user's hand;
retrieving one command of a plurality of different commands, the one command retrieved being associated with the plurality of output signals; and
executing the one commands retrieved in response to the performance of the contactless gesture.

16. The non-transitory computer-readable medium of claim 15, wherein the operations further comprise comparing an output signal to a baseline value.

17. The non-transitory computer-readable medium of claim 16, wherein the different orientation between the adjacent ones of the plurality of the curvilinearly arranged plates includes at least a height difference.

18. The non-transitory computer-readable medium of claim 17, wherein the operations further comprise associating the change to the one command of the plurality of different commands.

19. The non-transitory computer-readable medium of claim 15, wherein the operations further comprise sending the one command of the plurality of different commands to an on-board diagnostic system in a vehicle.

20. The non-transitory computer-readable medium of claim 15, wherein each curvilinearly arranged plate produces one particular output signal of the plurality of output signals, and each output signal is different from one another.

* * * * *

UNITED STATES PATENT AND TRADEMARK OFFICE
CERTIFICATE OF CORRECTION

| | | |
|---|---|---|
| PATENT NO. | : 10,025,431 B2 | Page 1 of 1 |
| APPLICATION NO. | : 14/078982 | |
| DATED | : July 17, 2018 | |
| INVENTOR(S) | : Li | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this
Twenty-fourth Day of September, 2019

Andrei Iancu
*Director of the United States Patent and Trademark Office*